(12) United States Patent
Krabach et al.

(10) Patent No.: US 8,041,778 B2
(45) Date of Patent: Oct. 18, 2011

(54) EXTENDED BROWSER DATA STORAGE

(75) Inventors: Todd Krabach, Duvall, WA (US); Scott M. Isaacs, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 11/789,862

(22) Filed: Apr. 26, 2007

(65) Prior Publication Data

US 2008/0270527 A1 Oct. 30, 2008

(51) Int. Cl.
*G06F 15/16* (2006.01)
*G06F 15/173* (2006.01)

(52) U.S. Cl. .................................. 709/218; 709/224

(58) Field of Classification Search .................. 709/218
See application file for complete search history.

(56) References Cited

U.S. PATENT DOCUMENTS

| | | | |
|---|---|---|---|
| 5,774,670 A | 6/1998 | Montulli | |
| 6,330,566 B1* | 12/2001 | Durham | 707/104.1 |
| 6,714,926 B1* | 3/2004 | Benson | 707/2 |
| 6,928,440 B2 | 8/2005 | Cordray et al. | |
| 6,934,736 B2 | 8/2005 | Sears, Jr. et al. | |
| 2004/0103197 A1* | 5/2004 | Benson | 709/227 |
| 2004/0215739 A1* | 10/2004 | Atamaniouk | 709/217 |
| 2005/0216844 A1* | 9/2005 | Error et al. | 715/745 |
| 2006/0041553 A1* | 2/2006 | Paczkowski et al. | 707/7 |
| 2006/0041562 A1* | 2/2006 | Paczkowski et al. | 707/10 |
| 2006/0136524 A1* | 6/2006 | Wohlers et al. | 707/204 |
| 2006/0136528 A1* | 6/2006 | Martin et al. | 707/205 |
| 2006/0155780 A1 | 7/2006 | Sakairi et al. | |
| 2006/0174327 A1* | 8/2006 | Song et al. | 726/3 |
| 2006/0212803 A1* | 9/2006 | Arokiaswamy | 715/520 |
| 2006/0259483 A1* | 11/2006 | Ozana | 707/5 |
| 2006/0277588 A1* | 12/2006 | Harrington et al. | 725/135 |
| 2006/0282327 A1* | 12/2006 | Neal et al. | 705/14 |
| 2006/0293957 A1* | 12/2006 | Petersen et al. | 705/14 |
| 2007/0005606 A1* | 1/2007 | Ganesan et al. | 707/10 |
| 2007/0073585 A1* | 3/2007 | Apple et al. | 705/14 |
| 2010/0205059 A1* | 8/2010 | Yehoshua et al. | 705/14.55 |
| 2010/0211450 A1* | 8/2010 | Landesmann | 705/14.25 |

OTHER PUBLICATIONS

"Mozilla Wiki", Date: Dec. 14, 2006, http://wiki.mozilla.org/Roadmap_Scratchpad.
"Storage", http://manual.dojotoolkit.org/WikiHome/DojoDotBook/Book50, Feb. 13, 2007.
Benninger, Corey, "AJAX Storage:A Look at Flash Cookies and Internet Explorer Persistence", Date: 2006, http://www.foundstone.com/resources/whitepapers/AJAXStorageWhitepaper.pdf.

* cited by examiner

*Primary Examiner* — Aaron Strange
*Assistant Examiner* — James Edwards

(57) ABSTRACT

A technique for a server application to store data in excess of a standard-size cookie on a client system. The technique employs a client-side abstraction layer that stores the data in a plurality of cookies associated with sub-domains associated with the server application. The technique further provides for the retrieval and aggregation of data stored in the plurality of cookies associated with sub-domains. The technique can be transparent to the server and a client-side browser. Through the technique, server applications can store data such as personal information and/or preferences in excess of a standard-size cookie.

20 Claims, 7 Drawing Sheets

EXTENDED BROWSER DATA STORAGE

BACKGROUND

The popularity of the Internet has dramatically changed people's interaction with the world. Computer users more frequently rely upon computers, and, more specifically, the Internet for services including, for example, electronic mail, web site navigation, chat rooms, instant messaging and the like. The user's computer can be referred to as a "client" with a web site's computer system referred to as a "server".

When a client sends a request for a service, the server can frequently personalize the information provided to the client using information relevant to the particular client (e.g., local weather forecast, particular stock quotes, local news, etc.). For example, upon an initial visit to a particular web site, the server can request the user to provide information, for example, personal information, preferences, location, and the like. The server can store this information in a "cookie" which is then stored on the client (e.g., user's computer system). "Cookie" refers to domain-specification information stored on the client which is usually stored in files on the user's computer system. When the user returns to a particular web site, the server obtain the previously stored cookie to personalize information provided to the client.

Conventionally, cookies stored on the client are limited to four kilobytes per domain as set forth in Request for Comments 2109 (RFC 2109). Generally, when greater storage is required, the data is transferred to the server. Due to constraint challenges, many web sites avoid storing detailed personalized information on the client.

Storage of user information on the server can present several challenges. Storage limitations associated with the server can necessitate minimizing a quantity of information stored and/or a quantity of users that can be supported by the server. Additionally, storage of the information is generally based on user identity with the server storing associating information on the client (e.g., via a cookie). In the event that the associating information on the client is deleted, the connection between the information stored on the server and the client has been lost. This can result in storage of data on the server which is inaccessible by the client.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

A technique for a server application to store data (e.g., in excess of a standard-size cookie) associated with a user (e.g., personal information) on a client is provided. The technique is client-centric as the technique does not require user authentication and/or consumption of server resource(s).

A client data storage system can utilize the technique to enable a browser to store data in excess of a standard-size cookie in a store via an abstraction layer. The abstraction layer can store and/or retrieve data, for example, in a plurality of cookies associated with sub-domains of the server application.

The abstraction layer can provide a storage mechanism for data which is transparent to the application and the browser. The abstraction layer can dynamically manage a sub-domain naming convention based, for example, on sequential letters, numbers, and/or combination thereof. Thus, when a request to store data in excess of a standard size cookie size, the abstraction layer can store the data in a plurality of cookies with each cookie storing part of the data.

The abstraction layer can aggregate and/or format the data to be stored (e.g., named value pairs etc.). Thereafter, the abstraction layer can serialize the aggregated data, for example, into a string. The abstraction layer can then write portions of the aggregated data into the cookies associated with the sub-domains until the aggregated data has been stored in the plurality of cookies.

In a subsequent session of the browser, upon the user's return visit to the web page associated with the application, the application can request the data (e.g., personalized information) from the browser. The browser can obtain the data from the abstraction layer which can retrieve and extract the data from the plurality of cookies.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
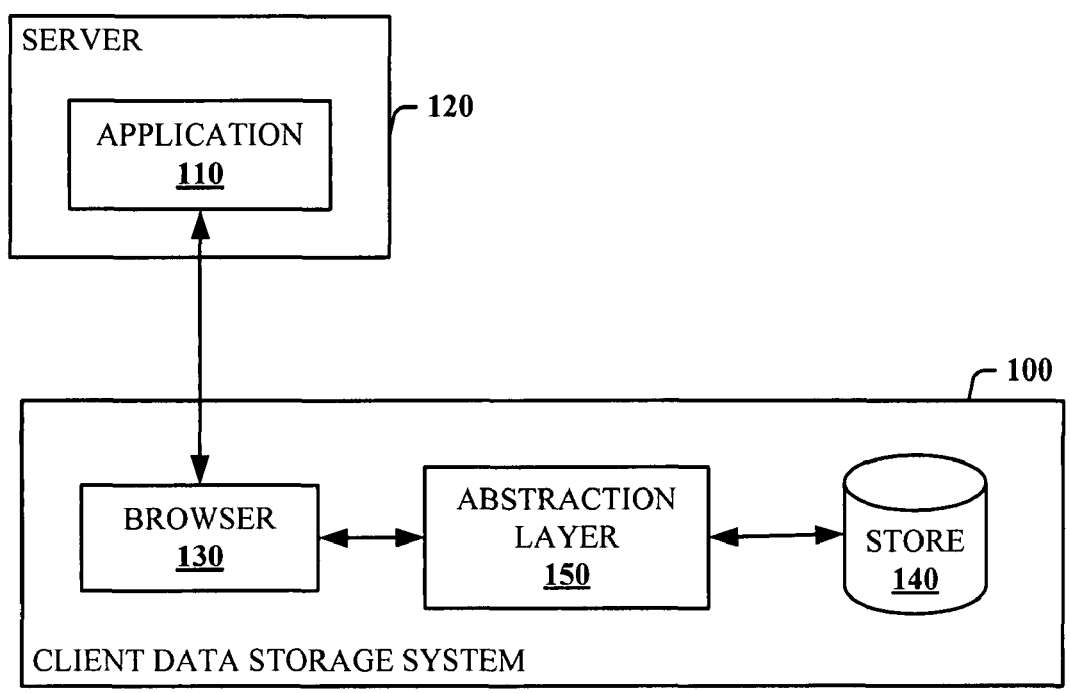
FIG. 1 illustrates a computer-implemented client data storage system.

The disclosed architecture provides a mechanism for a server to store data (e.g., in excess of a standard-size cookie) associated with a user (e.g., personal information) on a client without requiring user authentication and/or consumption of server resource(s).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented client data storage system 100. The system 100 provides a mechanism for an application 110 of a server 120 to store data (e.g., in excess of a standard-size cookie) associated with a user (e.g., personal information) on a client without requiring user authentication and without consumption of resource(s) of the server 120.

As noted previously, conventionally, client-side storage is limited to four kilobytes per domain. When greater storage is required, the data is transferred to the server 120 which can present storage and maintenance challenges.

The data storage system 100 can be employed on a client and enables a browser 130 to store data in excess of a standard-size cookie (e.g., four kilobytes) in a store 140 via an abstraction layer 150.

The browser 130 can be employed by a user to exchange information with the application 110. For example, upon a user's initial visit to a web page associated with the application 110, a user can be requested to provide data (e.g., personal information) in order to enrich the user's experience (e.g., personal interests, city, state, country, and the like). The application 110 can then request the data storage system 100 to store the data locally. In response to the request to store the data, the browser 130 can provide the data to the abstraction layer 150 which can then store the data in the store 140.

Upon the user's return visit to the web page associated with the application 110 (e.g., in a subsequent session of the browser 130), the application 110 can request the data from the browser 130. The browser 130 can obtain the data from the abstraction layer 150 which can retrieve, and, optionally, organize the data from the store 140. Thereafter, the browser 130 can provide the stored data to the application 110.

Figure 2:
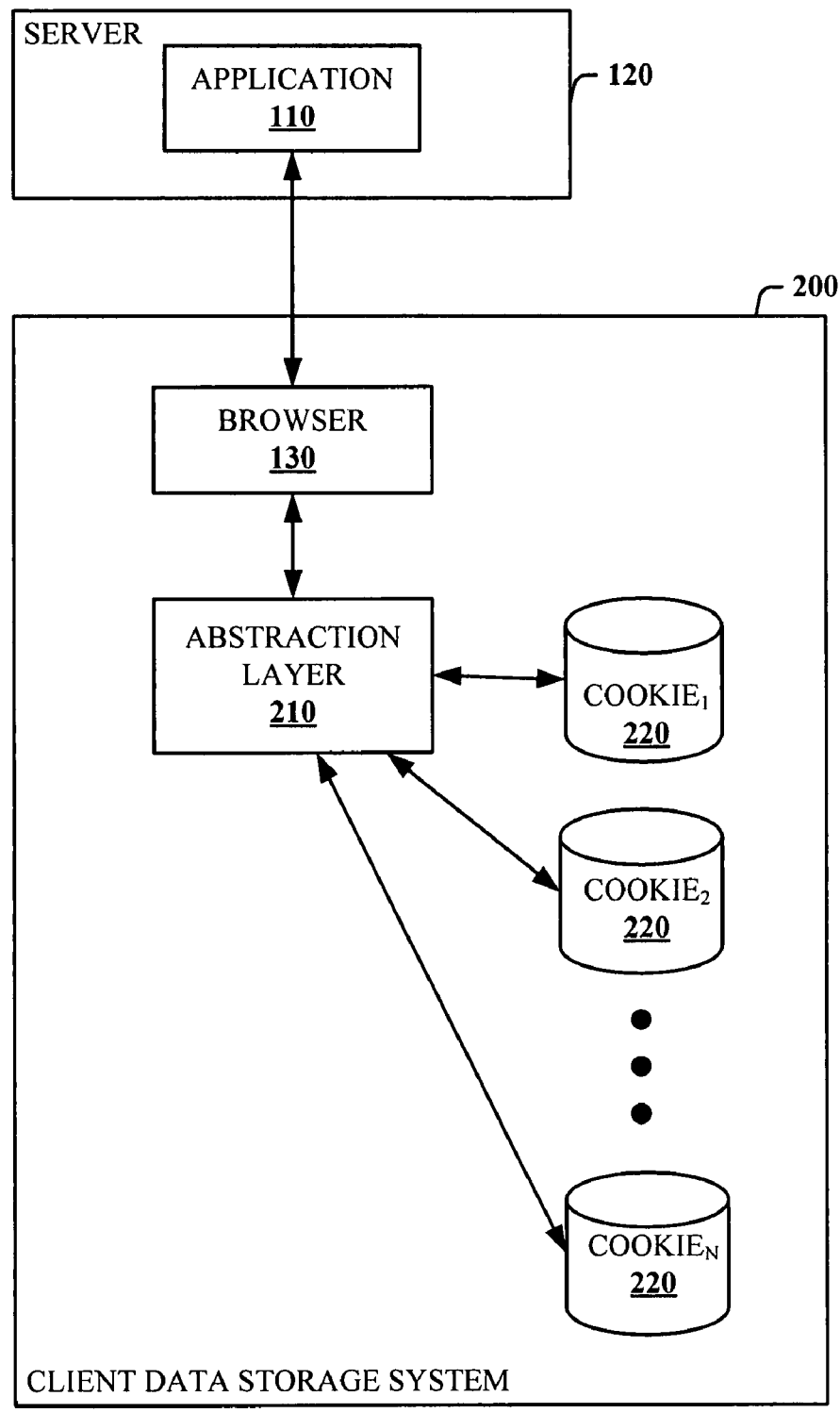
FIG. 2 illustrates a computer-implemented client data storage system employing a plurality of cookies.

Turning to FIG. 2, a computer-implemented client data storage system 200 is illustrated. The system 200 includes a browser 130 and an abstraction layer 210. The abstraction layer 210 manages storage of data in a plurality of cookies 220. In this manner, data in excess of size constraints of a single cookie 220 can be stored by an application 110.

In this embodiment, data associated with a particular domain (e.g., "domain.com") is stored in the plurality of cookies 220, with each cookie being associated with a particular sub-domain (e.g., "a.domain.com", "b.domain.com", etc.).

The abstraction layer 210 provides a storage mechanism for personal information which is transparent to the application 110 and the browser 130. The abstraction layer 210 can dynamically manage a sub-domain naming convention based, for example, on sequential letters, numbers, and/or combination thereof. Thus, when a request to store personal information in excess of a cookie size limit (e.g., four kilobytes) is received, the abstraction layer can store the personal information in a plurality of cookies 220 with each cookie 220 storing part of the personal information.

For example, the abstraction layer 210 can receive a request to store ten thousand bytes of personal information associated with a particular domain ("domain.com"). Since the request exceeds the size of an individual cookie 220, the abstraction layer 210 can dynamically create sub-domains (e.g., "a.domain.com", "b.domain.com" and "c.domain.com"). In this example, by creating sub-domains, the browser 130 can allow communication between the sub-domains, as described in greater detail below.

Continuing, the abstraction layer 210 can aggregate and/or format the personal information to be stored (e.g., named value pairs, etc.). Thereafter, the abstraction layer 210 can serialize the aggregated personal information, for example, into a string. The abstraction layer 210 can then write portions of the aggregated personal information into the cookies 220 associated with the sub-domains (e.g., in four kilobyte chunks) until the aggregated personal information has been stored in the plurality of cookies 220. In one example, an end-of-file indicator is stored in the final cookie 220 to indicate to the abstraction layer 210 that the end of stored personal information has been reached.

In a subsequent session of the browser 130, upon the user's return visit to the web page associated with the application 110, the application 110 can request the data from the browser 130. The browser 130 can obtain the data from the abstraction layer 210 which can retrieve the personal information from the plurality of cookies 220. The abstraction layer 210 can extract the data and provide the data to the browser 130. The browser 130 can then provide the stored data to the application 110.

Figure 3:
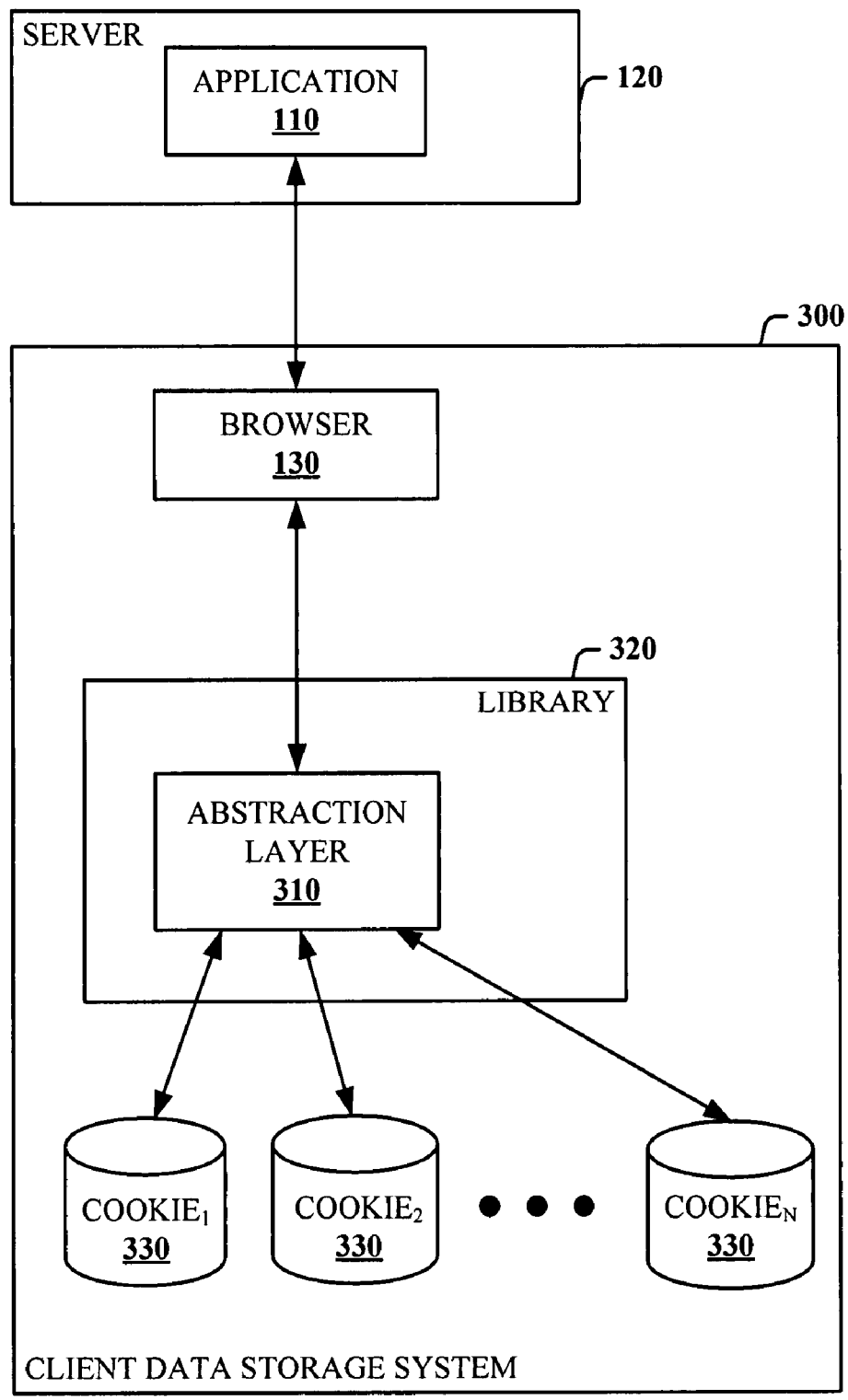
FIG. 3 illustrates a computer-implemented client data storage system utilizing a library of a browser.

Next, referring to FIG. 3, a computer-implemented client data storage system 300 is illustrated. In this embodiment, an abstraction layer 310 is a component of an Asynchronous Javascript and XML (AJAX) library 320 associated with the browser 130. For example, the abstraction layer 310 can employ a hidden inline floating frame (iframe) of the browser 130 for each sub-domain. In this manner, a main document (e.g., domain.com) can set an associated "document.domain" property to a subset of the domain that is shared with the domains of the iframes and each of the iframe documents can likewise set the document.domain property associated with the iframe to the same value. Thus, hidden iframes can be employed to enumerate and walkthrough the sub-domain cookies 330 to retrieve stored personal information.

With iframes, document object model (DOM) inspection can be performed from one document to another document. DOM is a specification for how objects in a web page (e.g., text, images, headers, links, etc.) are represented.

The iframe windows can then create interfaces to cookie 330 data that can be exposed to the main document. For example, the iframes can have functions defined for getting, setting and deleting value(s) from the cookies 330 as properties of a window object in the iframe document. Then the iframe can call a function in the associated parent document to register the iframe, passing a reference to the window object. The main document contains references to the window object in each of the iframes with functions defined on the iframes for getting, setting, and deleting values from the cookies 330 of the various sub-domains. The main window can combine the data stored in the cookies 330 thus yielding a greater storage capacity per domain.

In one example, iframes are instantiated for each cookie 330. In another example, a single iframe is instantiated with each sub-domain, in turn, retrieving personal information from an associated cookie 330. In yet another example, the abstraction layer 310 can employ an optimization in calculating a quantity of iframes to be instantiated in order to retrieve the stored personal information, for example, based on a quantity of information stored in the plurality of cookies 330 associated with a particular domain and sub-domains.

In one embodiment, when data stored in the plurality of cookies 330 associated with a particular domain is changed, the cookies are overwritten. In another embodiment, when data stored in the cookies 330 is changed, the modified data is appended to the end of the data. The abstraction layer 310 then overwrites previous values retrieved from the cookies 330 based on the modified data. Once a threshold quantity of data has been modified, the plurality of cookies 330 can be overwritten.

Various embodiments been described herein as employing standard-sized cookies (e.g., four kilobytes); however, those skilled in the art will recognize that cookies of any suitable size can be employed. The scope of the hereto appended claims is intended to encompass all such cookies.

Figure 4:
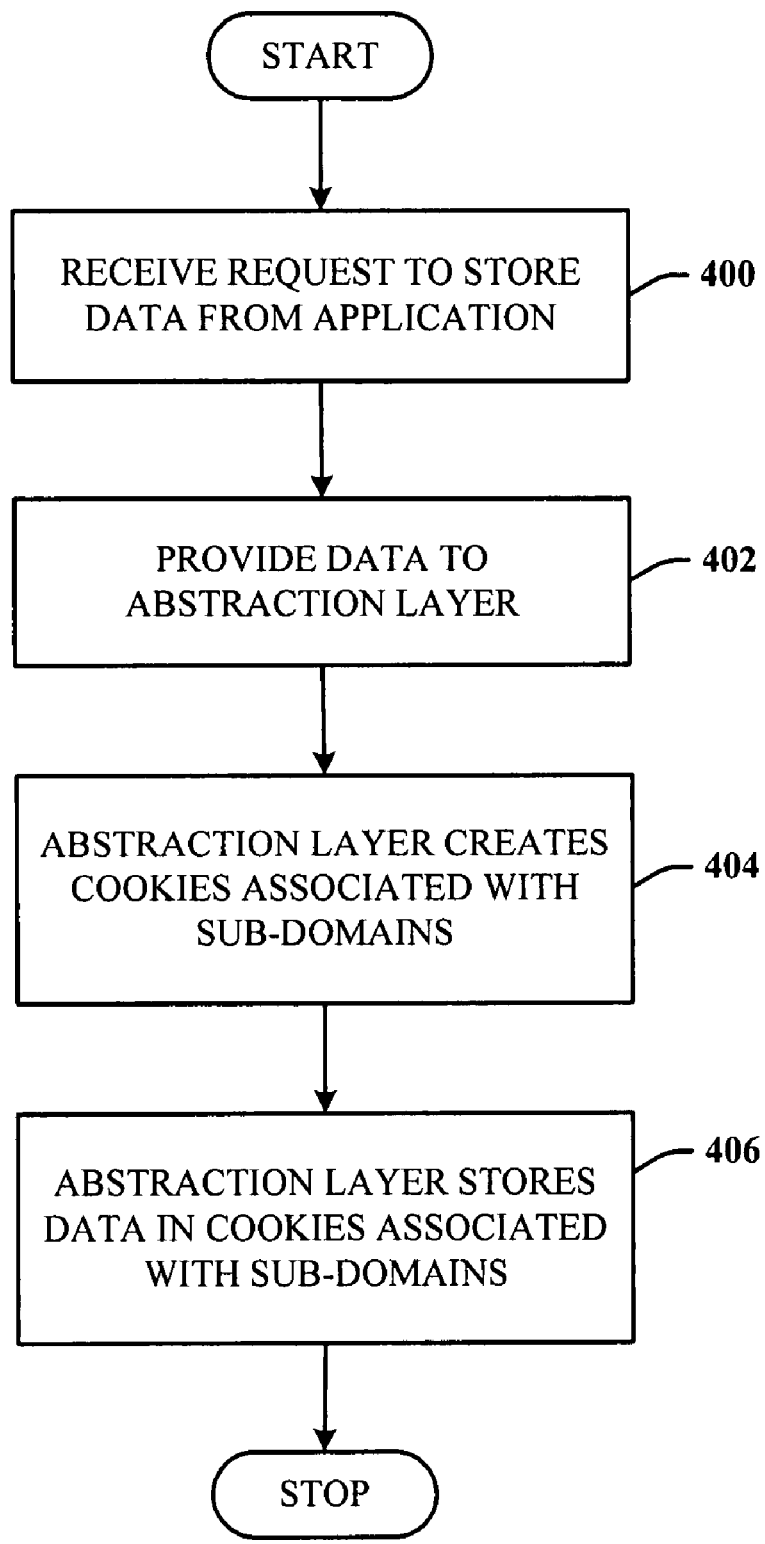
FIG. 4 illustrates a method of storing data in cookies.

FIG. 4 illustrates a method of storing data in cookies. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, a request to store data (e.g., personal information) is received from an application, the application associated with a particular domain. At 402, the data is provided to an abstraction layer, for example, by a browser. At 404, the abstraction layer creates cookies associated with sub-domains of the particular domain (e.g., based on a size of the data). For example, the abstraction layer can employ a hidden iframe of the browser, as described previously. At 406, the abstraction layer stores the data in cookies associated with the sub-domains. In one example, the data is sequentially stored in the cookies. In another example, the data is stored in the cookies substantially in parallel. Optionally, the abstraction layer can employ a hidden iframe of the browser to store the data in the cookies.

Figure 5:
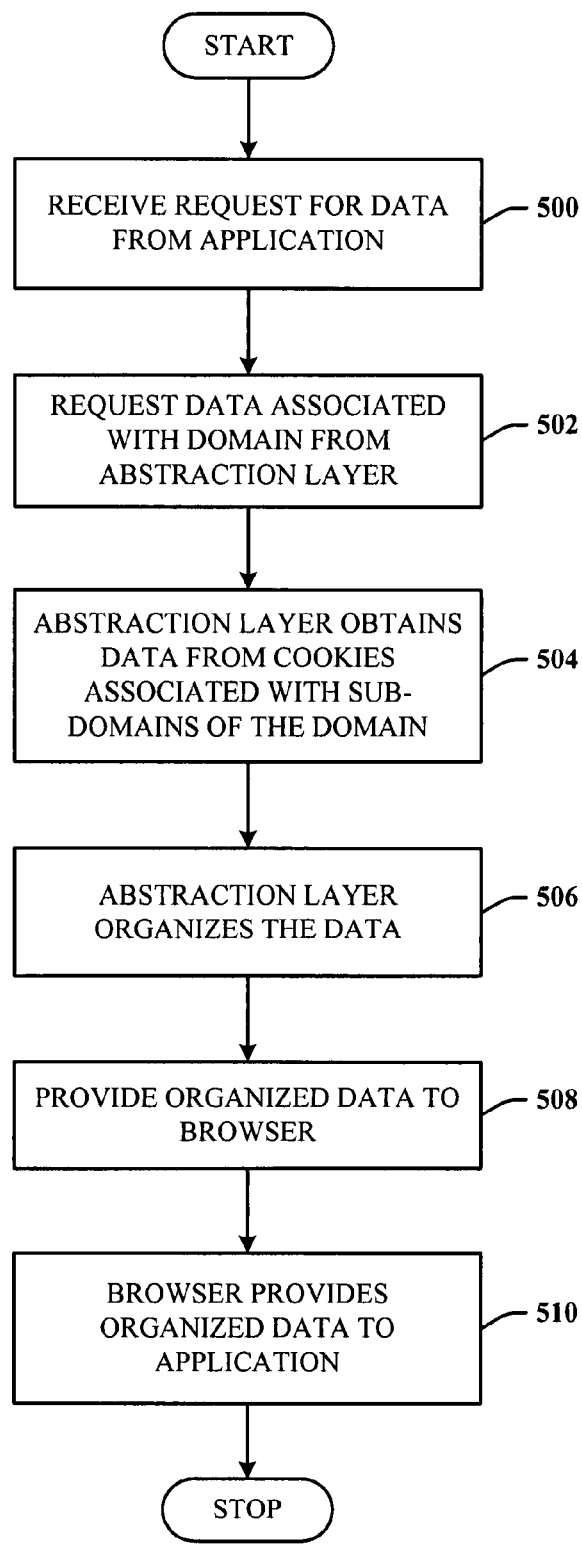
FIG. 5 illustrates a method of retrieving data stored in cookies.

FIG. 5 illustrates a method of retrieving data stored in cookies. At 500, a request for data is received from an application, the application associated with a particular domain. At 502, data associated with the domain is requested from an abstraction layer. At 504, the abstraction layer obtains data from cookies associated with sub-domains of the domain. For example, the abstraction layer can sequentially obtain data from the cookies. Alternatively, the abstraction layer can obtain data from the cookies substantially in parallel. At 506, the abstraction layer organizes the data obtained from the cookies. At 508, the abstraction layer provides the organized data, for example, to a browser. At 510, the browser provides the organized data to the application.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 6:
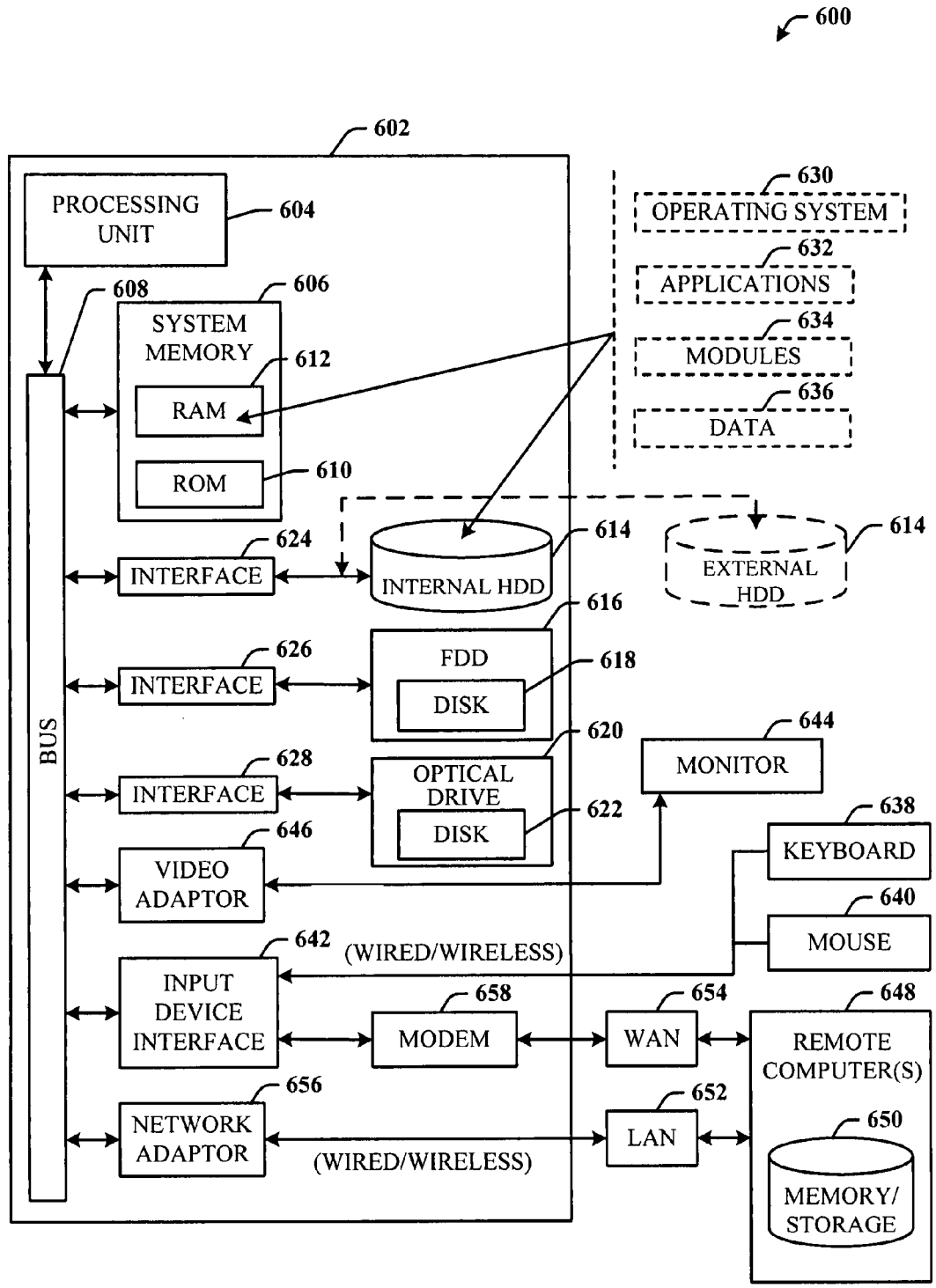
FIG. 6 illustrates a computing system operable to execute the disclosed architecture.

Referring now to FIG. 6, there is illustrated a block diagram of a computing system 600 operable to execute the disclosed architecture. In order to provide additional context for various aspects thereof, FIG. 6 and the following discussion are intended to provide a brief, general description of a suitable computing system 600 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 6, the exemplary computing system 600 for implementing various aspects includes a computer 602, the computer 602 including a processing unit 604, a system memory 606 and a system bus 608. The system bus 608 provides an interface for system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture. Referring briefly to FIGS. 2, 3 and 6, the cookies 220, 330 can be stored on the hard disk drive 614.

A number of program modules can be stored in the drives and RAM 612, including an operating system 630, one or more application programs 632, other program modules 634 and program data 636. All or portions of the operating system, applications, modules, and/or data can also be cached in the RAM 612. It is to be appreciated that the disclosed architecture can be implemented with various commercially available operating systems or combinations of operating systems.

A user can enter commands and information into the computer 602 through one or more wired/wireless input devices, for example, a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. Referring briefly to FIGS. 2, 3 and 6, the application 110 can be stored on a remote computer 648.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 7:
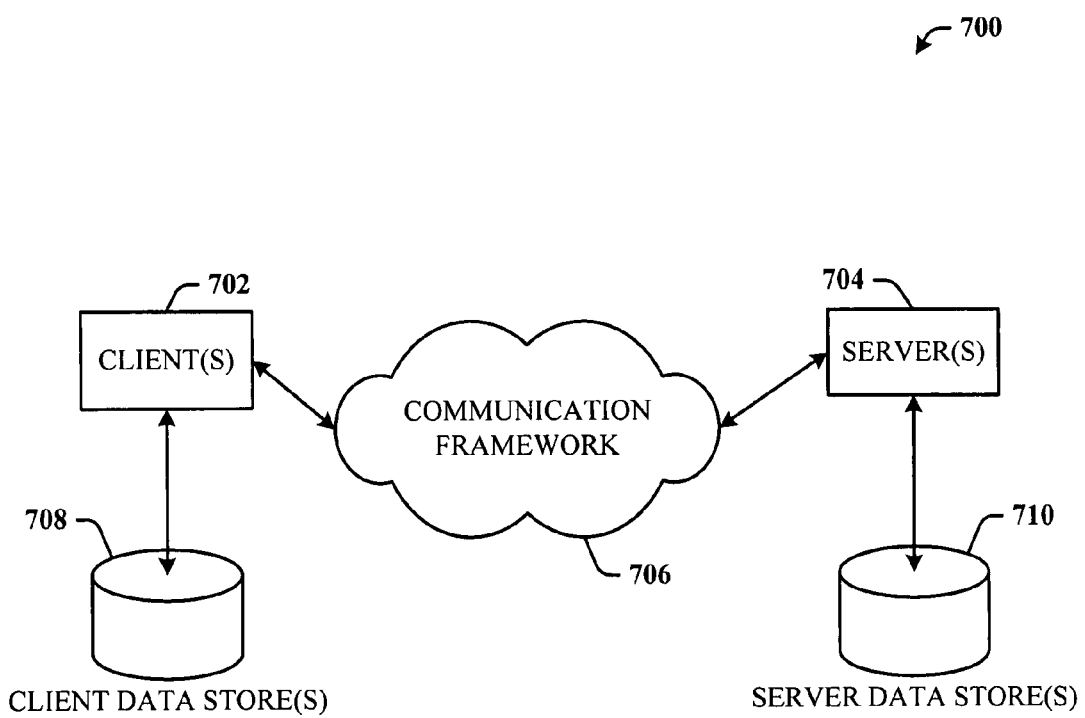
FIG. 7 illustrates an exemplary computing environment.

Referring now to FIG. 7, there is illustrated a schematic block diagram of an exemplary computing environment 700 that facilitate a client-server environment. The system 700 includes one or more client(s) 702. The client(s) 702 can be hardware and/or software (e.g., threads, processes, computing devices). The client(s) 702 can house cookie(s) and/or associated contextual information, for example.

The system 700 also includes one or more server(s) 704. The server(s) 704 can also be hardware and/or software (e.g., threads, processes, computing devices). The servers 704 can house threads to perform transformations by employing the architecture, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704. Referring to FIGS. 2, 3 and 7, the cookies 220, 330 can be stored in the client data stores 708.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method for extending client data storage of browser cookie data, comprising:

determining an amount of information to be stored on a client device in the form of a cookie based at least upon a request from a server associated with a domain;

creating one or more sub-domains of the domain based upon the determined amount of information to be stored if the determined amount of information exceeds a size limit for cookies associated with a single domain;

associating respective sub-domains with a respective cookie;

storing a first portion of the information in a first cookie associated with a first sub-domain; and storing a second portion of the information in a second cookie associated with a second sub-domain, if the determined amount of information exceeds a size limit for a single cookie.

2. The computer implemented method of claim 1, the one or more sub-domains being created on the client device.

3. The computer implemented method of claim 1, the one or more sub-domains and associated cookies being transparent to at least one of an application associated with the domain and a browser configured to access the server associated with the domain.

4. The computer implemented method of claim 1, comprising:

receiving the information to be stored on the client device from an application associated with the domain; and serializing the information into a string, a first portion of the string written to the first cookie and a second portion of the string written to the second cookie.

5. The computer implemented method of claim 4, comprising:

adding an end-of-file indicator to a cookie storing an end portion of the string to indicate that an end of the string has been reached.

6. The computer implemented method of claim 1, comprising:

receiving a request to access the information stored in the one or more cookies from an application associated with the domain;

extracting the information from the one or more cookies;

organizing the extracted information if the information is stored in two or more cookies; and providing the organized information to the application.

7. The computer implemented method of claim 1, comprising:

employing a hidden inline floating frame of a browser to at least one of create the cookies associated with at least one sub-domain and store at least some of the information in one or more cookies.

8. The computer implemented method of claim 7, respective inline floating frames exposing at least one of a function for getting, a function for setting, and a function for deleting a value of at least one of the cookies associated with a sub-domain.

9. The computer implemented method of claim 1, storing the first portion of the information in the first cookie and storing the second portion of the information in the second cookie comprising storing the information in the first and second cookies sequentially.

10. The computer implemented method of claim 1, storing the first portion of the information in the first cookie and storing the second portion of the information in the second cookie comprising storing the information in the first and second cookies in parallel.

11. The computer implemented method of claim 1, the size limit for cookies associated with the single domain comprising four kilobytes.

12. A computer-implemented client data storage system, comprising:

an abstraction layer situated on a client device and configured to receive data yielded from a server associated with a domain and to store the received data in one or more cookies, a number of cookies used to store the received data depending at least upon a size of the data to be stored and size limitations of cookies associated with a single domain, and, if portions of the data are to be stored in two or more cookies, the abstraction layer configured to create one or more sub-domains of the domain, respective sub-domains associated with a respective cookie.

13. The system of claim 12, the abstraction layer configured to aggregate the data yielded from the server and to serialize the aggregated data into a string.

14. The system of claim 13, the abstraction layer configured to store a first portion of the aggregated data in a first cookie associated with a first sub-domain and to store a second portion of the aggregated data in a second cookie associated with a second sub-domain.

15. The system of claim 12, the abstraction layer configured to receive a request from a browser for the data stored in the one or more cookies, to extract the data from the one or more cookies, to organize the extracted data if the data stored in the one or more cookies is stored in multiple cookies, and to provide at least one of the data stored in the one or more cookies and the organized data to the browser.

16. The system of claim 12, the abstraction layer a component of a library associated with a browser in operable communication with the server associated with the domain.

17. The system of claim 12, the abstraction layer configured to employ a hidden inline floating frame of a browser in operable communication with the server associated with the domain.

18. The system of claim 12, the abstraction layer configured to employ a plurality of inline floating frames of a browser in operable communication with the server associated with the domain, respective inline floating frames configured to expose at least one of a function for getting, a function for setting, and a function for deleting a value of one of the cookies.

19. A computer readable storage media comprising computer executable instructions that when executed via a microprocessor perform a method, comprising:

creating, based upon an amount of data, associated with a domain, to be stored on a client device, one or more sub-domains of the domain requesting that the data be stored on the client device, a number of sub-domains a function of a number of cookies required to store the data;

storing a first portion of the data in a first cookie associated with a first sub-domain; and storing a second portion of the data in a second cookie associated with a second sub-domain, if the data cannot be stored in the first cookie in its entirety due at least in part to a size of the data to be stored.

20. The computer readable storage media of claim 19, comprising employing a hidden inline floating frame for respective sub-domains, a document.domain property associated with a main document of the domain and a document.domain property associated with the hidden inline floating frame for respective sub-domains is set to a same value.

* * * * *